(12) United States Patent
Hill et al.

(10) Patent No.: US 10,107,127 B2
(45) Date of Patent: Oct. 23, 2018

(54) GAS TURBINE ENGINE WITH AXIAL COMPRESSOR HAVING IMPROVED AIR SEALING

(71) Applicant: United Technologies Corporation, Hartford, CT (US)

(72) Inventors: James Hill, Tolland, CT (US); Brian Merry, Andover, CT (US); Gabriel Suciu, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 691 days.

(21) Appl. No.: 14/793,468

(22) Filed: Jul. 7, 2015

(65) Prior Publication Data

US 2016/0032753 A1     Feb. 4, 2016

Related U.S. Application Data

(60) Provisional application No. 62/031,627, filed on Jul. 31, 2014.

(51) Int. Cl.
*F01D 11/04* (2006.01)
*F01D 5/06* (2006.01)
(Continued)

(52) U.S. Cl.
CPC ............... *F01D 11/04* (2013.01); *F01D 5/06* (2013.01); *F01D 5/18* (2013.01); *F01D 5/225* (2013.01);
(Continued)

(58) Field of Classification Search
CPC .......... F01D 11/04; F01D 5/18; F01D 11/006; F01D 5/225; F01D 5/24; F01D 11/001;
(Continued)

(56) References Cited

U.S. PATENT DOCUMENTS 6,312,218 B1 * 11/2001 Beeck .................. F01D 11/005
                                                    415/173.7
6,893,215 B2 *  5/2005 Kuwabara ............ F01D 11/005
                                                    415/115
(Continued)

FOREIGN PATENT DOCUMENTS

EP        2075411       7/2009
WO     20130139837     9/2013

OTHER PUBLICATIONS

Extended European Search Report dated Jan. 7, 2016 in European Application No. 15178880.9.

*Primary Examiner* — Woody Lee, Jr.
*Assistant Examiner* — Adam W Brown
(74) *Attorney, Agent, or Firm* — Snell & Wilmer, L.L.P.

(57) ABSTRACT

A gas turbine engine including an axial high pressure compressor having expansion slots in the outer rim of the rotor section. The expansion slots may be positioned between blades of a rotor segment. The fore end of the slots may have an axial seal which is coupled to the inner surface of the outer rim in the first rotor segment, and may comprise a fin configuration. The axial seal may be integral to the inner surface of the outer rim. The compressor may comprise a plurality of expansion slots and axial seals, including in a plurality of rotor segments.

20 Claims, 3 Drawing Sheets

(51) Int. Cl.
*F01D 5/22* (2006.01)
*F01D 5/24* (2006.01)
*F01D 11/00* (2006.01)
*F01D 5/18* (2006.01)

(52) U.S. Cl.
CPC .............. *F01D 5/24* (2013.01); *F01D 11/001* (2013.01); *F01D 11/005* (2013.01); *F01D 11/006* (2013.01); *F05D 2240/55* (2013.01); *Y02T 50/673* (2013.01)

(58) Field of Classification Search
CPC ........ F01D 11/005; F01D 5/06; Y02T 50/673; F05D 2240/55
See application file for complete search history.

(56) References Cited

U.S. PATENT DOCUMENTS

| | | | |
|---|---|---|---|
| 7,175,387 B2* | 2/2007 | Kreis | F01D 5/22 277/628 |
| 7,798,769 B2* | 9/2010 | Keller | F01D 5/22 29/888.3 |
| 8,303,257 B2* | 11/2012 | Heinz-Schwarzmaier | F01D 11/005 277/418 |
| 2012/0057988 A1* | 3/2012 | Stiehler | F01D 5/22 416/97 R |

* cited by examiner

GAS TURBINE ENGINE WITH AXIAL COMPRESSOR HAVING IMPROVED AIR SEALING

CROSS-REFERENCE TO RELATED APPLICATIONS

This application is a nonprovisional of, and claims priority to, and the benefit of U.S. Provisional Application No. 62/031,627, entitled "GAS TURBINE ENGINE WITH AXIAL COMPRESSOR HAVING IMPROVED AIR SEALING," filed on Jul. 31, 2014, which is hereby incorporated by reference in its entirety.

FIELD

The present disclosure relates generally to axial compressor portions of gas turbine engines and more specifically, to axial compressors having improved air sealing of slots in the rotor assembly.

BACKGROUND

Gas turbine engines generally include a compressor, such as an axial compressor, to pressurize inflowing air. Axial compressors may include number of rotor segments adjacent and coupled to each other in the axial direction. The outer rim of the rotor segments may utilize expansion slots to help reduce hoop stresses on the outer rim. As the compressor operates, air enters the expansion slots, and may mix with and increase the temperature of cooling air within the rotor assembly. Cooling of the inner and outer rim may tend to prevent fatigue and potentially extend the life of the material of the rims. Hot air may escape through, for example, the expansion slots, and thereby reducing the cooling effect of the cooling air and/or interrupting the aerodynamic flow of air through the compressor.

SUMMARY

A gas turbine engine compressor according to an embodiment comprises a rotary assembly comprising an outer rim and a blade, an expansion slot cut through an outer surface and an inner surface of the outer rim, wherein the slot has a fore end and an aft end, and a radial seal, and an axial seal disposed at the fore end of the slot. The rotary assembly comprises a first rotor segment and a second rotor segment, and the first rotor segment may comprise a spacer and the second rotor segment may comprise a plurality of blades. The expansion slot may be disposed in the second rotor segment. The axial seal is coupled to the inner surface of the outer rim in the first rotor segment, and may comprise a fin configuration. The axial seal may be integral to the inner surface of the outer rim. The compressor may comprise a plurality of expansion slots and axial seals, wherein each axial seal corresponds to an expansion slot. Further, expansion slot may be disposed between two of the plurality of blades.

A gas turbine engine according to an embodiment comprises an axial high pressure compressor having a rotary assembly comprising an outer rim and a blade, an expansion slot cut through an outer surface and an inner surface of the outer rim, wherein the slot has a fore end and an aft end, and a radial seal, and an axial seal disposed at the fore end of the slot. The rotary assembly comprises a first rotor segment and a second rotor segment, and the first rotor segment may comprise a spacer and the second rotor segment may comprise a plurality of blades. The expansion slot may be disposed in the second rotor segment. The axial seal is coupled to the inner surface of the outer rim in the first rotor segment, and may comprise a fin configuration. The axial seal may be integral to the inner surface of the outer rim. The compressor may comprise a plurality of expansion slots and axial seals, wherein each axial seal corresponds to an expansion slot. Further, expansion slot may be disposed between two of the plurality of blades.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

As used herein, "aft" refers to the direction associated with the tail of an aircraft, or generally, to the direction of exhaust of the gas turbine. As used herein, "forward" and/or "fore" refers to the direction associated with the nose of an aircraft, or generally, to the direction of flight or motion.

Figure 1:
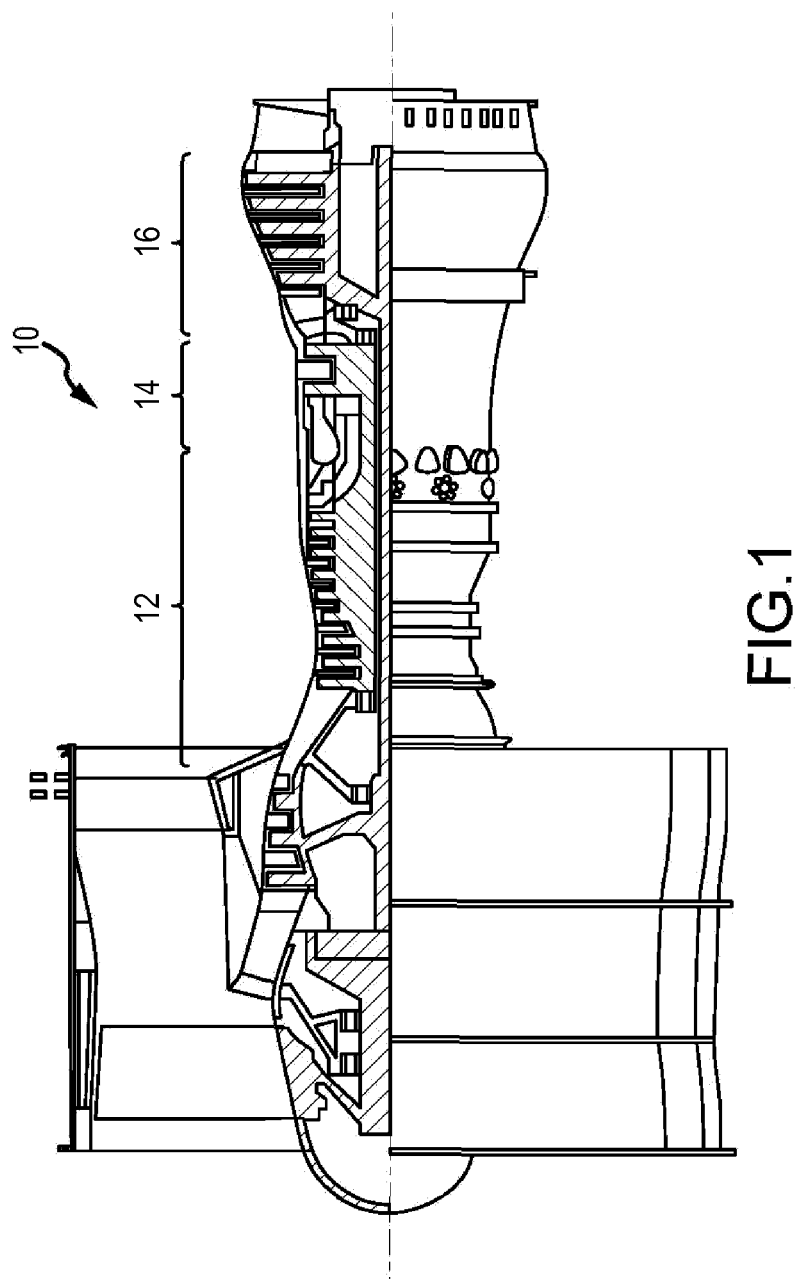
FIG. 1 illustrates, in accordance with various embodiments, a side view of a gas turbine engine.

Axial compressors in accordance with the present disclosure may include multiple rotor segments having expansion slots in one or more outer surfaces. The fore end of the expansion slots may include axial seals configured to reduce or prevent unwanted mixing of hotter air from the expansion slots from entering into cooling air passing through cooling channels of the rotor segments, Accordingly, with reference to FIG. 1, a gas turbine engine 10 is shown. In general terms, gas turbine engine 10 may comprise a compressor section 12. Air may flow through compressor section 12 and into a combustion chamber 14, where the air is mixed with a fuel source and ignited to produce hot combustion gasses. These hot combustion gasses may drive a series of turbine blades within a turbine section 16, which in turn drive, for example, one or more compressor section blades mechanically coupled thereto.

Figure 2:
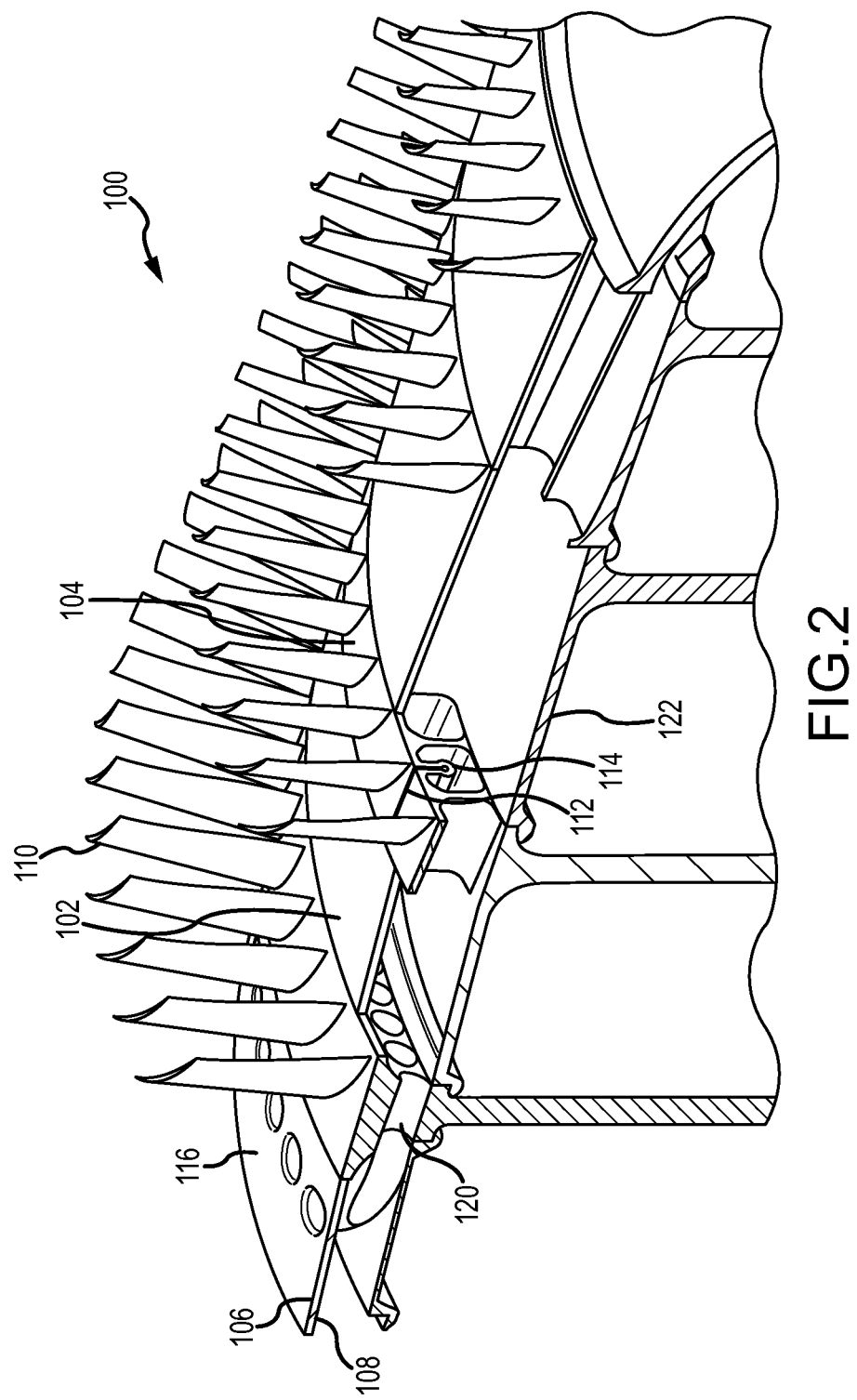
FIG. 2 illustrates, in accordance with various embodiments, a partial cross-sectional view of a compressor portion of a gas turbine engine.
Figure 3:
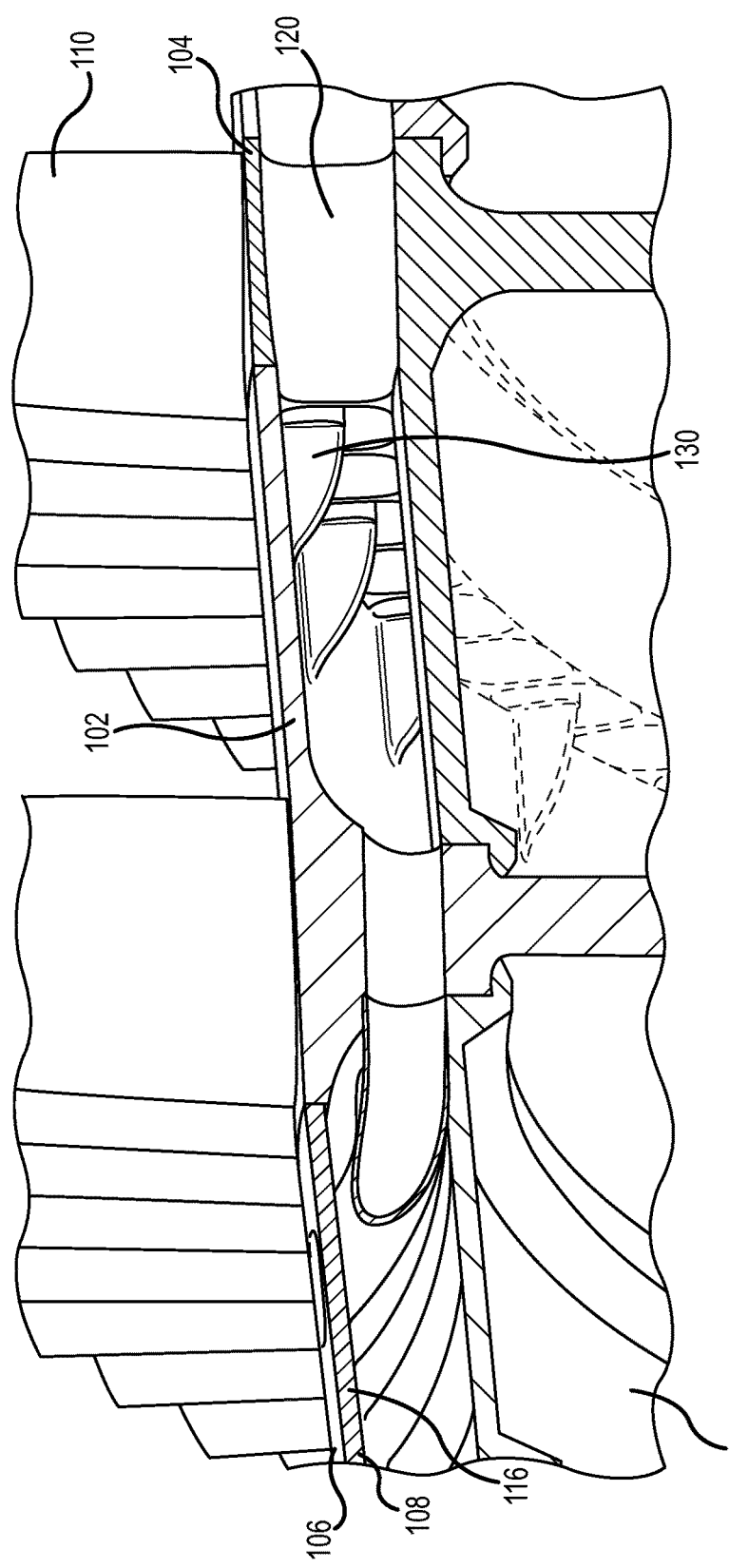
FIG. 3 illustrates, in accordance with various embodiments, a partial cross-sectional view of a compressor portion of a gas turbine engine.

With reference to FIGS. 2 and 3, compressor section 12 may comprise a high pressure section 100. High pressure section 100 may comprise, for example, a plurality of rotor segments adjacent to and coupled to each other in the axial direction. For example, high pressure section 100 may comprise a first rotor segment 102. In various embodiments, first rotor segment 102 may comprise an outer rim 116 having an outer surface 106 and an inner surface 108.

In further embodiments, first rotor segment 102 may comprise a blade segment having a plurality of blades 110. Plurality of blades 110 may be affixed or otherwise coupled to outer surface 106 of first rotor segment 102. In further embodiments, first rotor segment 102 may comprise a spacer segment having zero blades, or a vane segment including non-rotating vanes to direct air to blades in subsequent segments.

In various embodiments, high pressure section 100 may further comprise a second rotor segment 104. For example, second rotor segment 104 may comprise a blade segment having a multiplicity of blades 110 affixed or otherwise coupled to outer surface 106 of second rotor segment 104. Second rotor segment 104 may be adjacent to and coupled to first rotor segment 102. In various embodiments, second rotor segment 104 is positioned aft of first rotor segment 102.

In various embodiments, outer rim 116 of second rotor segment 104 comprises an expansion slot 112. Expansion slot 112 may comprise a radially-projecting opening that passes through outer surface 106 and inner surface 108 of outer rim 116. In various embodiments, expansion slot 112 may be positioned between two blades 110, and may assist reducing hoop stresses on outer rim 116.

Expansion slot 112 may, for example, extend into a cooling channel 120. In various embodiments, one or more cooling channels 120 may be disposed between outer rim 116 and an inner rim 122. In such embodiments, cooling channels 120 may allow cooler air to enter and pass between inner rim 122 and outer rim 116, cooling one or both rims. As air passes axially across outer surface 106 of outer rim 116, it rapidly increases in temperature. Expansion slot 112 may undesirably allow hotter air from outside of outer surface 106 to enter and mix with the cooling air of cooling channels 120, reducing the cooling ability of the cooling air. Therefore, it may be beneficial to prevent air from escaping the portion of expansion slot 112 that extends into cooling channels 120.

In various embodiments, expansion slot 112 may further comprise and be defined by a radial seal 114. For example, in embodiments in which expansion slot 112 extends into cooling channel 120, radial seal 114 may comprise a structure which reduces the ability of air travelling through expansion slot 112 to enter cooling channel 120. In various embodiments, radial seal 114 comprises a perimeter of material around the portion of expansion slot 112 disposed within cooling channel 120. In such embodiments, radial seal 114 may segregate the air in expansion slot 112 from entering cooling channel 120 in the radial direction.

With reference to FIG. 3, in various embodiments, high pressure section 100 further comprises an axial seal 130. For example, axial seal 130 may comprise a structure which reduces the ability of air traveling through expansion slot 112 to enter cooling channel 120 in the axial direction.

In various embodiments, axial seal 130 may be positioned fore of radial seal 114. Stated another way, axial seal 130 is positioned in front of the portion of expansion slot 112 which extends below inner surface 108 of outer rim 116. For example, axial seal 130 may comprise a fin configuration located fore of radial seal 114 and expansion slot 112, such that the point of the fin is pointing towards the incoming air of cooling channel 120. Axial seal 130 may be configured and shaped to reduce drag and air flow disturbance in the axial direction as well as provide axial sealing. However, any configuration of axial seal 130 which segregates air from expansion slot 112 from cooling air of cooling channel 120 is within the scope of the present disclosure.

In various embodiments, axial seal 130 may be coupled to inner surface 108. For example, axial seal 130 may be integral to and formed with outer rim 116 such that axial seal 130 extends inwardly from inner surface 108. In further embodiments, axial seal 130 may be formed separately from outer rim 116 and affixed, attached, or coupled to inner surface 108 of outer rim 116.

In various embodiments, high pressure section 100 may comprise multiple rotor segments (such as first rotor segment 102 and second rotor segment 104) comprising multiple expansion slots 112. In various embodiments, axial seals 130 may be positioned in a rotor segment adjacent to the rotor segment comprising expansion slots 112, such that each axial seal 130 corresponds with an expansion slot 112. For example, one or more axial seals 130 may be positioned within first rotor segment 102 and correspond with and provide sealing to one or more expansion slots 112 positioned in second rotor segment 104 (which is adjacent to and aft of first rotor segment 102). Although described in connection with specific examples, any number and configuration of expansion slots 112 and axial seals 130 is within the scope of the present disclosure.

Benefits, other advantages, and solutions to problems have been described herein with regard to specific embodiments. Furthermore, the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine compressor comprising:
   a rotor assembly comprising an outer rim and a blade;
   an expansion slot passing through an outer surface and an inner surface of the outer rim, wherein the expansion slot includes a fore end and an aft end;
   a radial seal defining a portion of the expansion slot, wherein the portion of the expansion slot is devoid of material; and
   an axial seal disposed at the fore end of the expansion slot, the axial seal comprising a fin configuration, wherein a point of the axial seal is located at a forward end of the axial seal.

2. The gas turbine engine compressor of claim 1, wherein the rotor assembly comprises a first rotor segment and a second rotor segment.

3. The gas turbine engine compressor of claim 2, wherein the second rotor segment comprises the blade.

4. The gas turbine engine compressor of claim 3, wherein the expansion slot is disposed in the second rotor segment.

5. The gas turbine engine compressor of claim 4, wherein the axial seal is coupled to the inner surface of the outer rim in the first rotor segment.

6. The gas turbine engine compressor of claim 1, wherein the rotor assembly further comprises an inner rim and a cooling channel disposed between the inner rim and the outer rim, and wherein the axial seal and the radial seal are configured to segregate air in the expansion slot from air in the cooling channel.

7. The gas turbine engine compressor of claim 1, wherein the axial seal is integral to the inner surface of the outer rim.

8. The gas turbine engine compressor of claim 1, comprising a plurality of expansion slots, radial seals, and axial seals, wherein each radial seal and each axial seal corresponds to one expansion slot.

9. The gas turbine engine compressor of claim 1, further comprising a plurality of blades, wherein the expansion slot is disposed between two of the plurality of blades.

10. The gas turbine engine compressor of claim 1, wherein the radial seal extends into a cooling channel and the axial seal is located within the cooling channel.

11. A gas turbine engine comprising:
    an axial high pressure compressor comprising a rotary assembly including an outer rim and a blade;
    an expansion slot passing through an outer surface and an inner surface of the outer rim, wherein the expansion slot has a fore end and an aft end;
    a radial seal defining a portion of the expansion slot, wherein the portion of the expansion slot is devoid of material; and
    an axial seal disposed at the fore end of the expansion slot, wherein the axial seal extends from a forward end of the radial seal to the inner surface of the outer rim.

12. The gas turbine engine of claim 11, wherein the rotary assembly comprises a first rotor segment and a second rotor segment.

13. The gas turbine engine of claim 12, wherein the second rotor segment comprises the blade.

14. The gas turbine engine of claim 13, wherein the expansion slot is disposed in the second rotor segment.

15. The gas turbine engine of claim 14, wherein the axial seal is coupled to the inner surface of the outer rim in the first rotor segment.

16. The gas turbine engine of claim 11, wherein the axial seal comprises a fin shape configured to reduce drag in an axial direction.

17. The gas turbine engine of claim 15, wherein the axial seal is integral to the inner surface of the outer rim.

18. The gas turbine engine of claim 11, comprising a plurality of expansion slots, radial seals, and axial seals, wherein each radial seal and each axial seal corresponds to one expansion slot.

19. The gas turbine engine of claim 11, wherein the radial seal extends into a cooling channel and the axial seal is located within the cooling channel.

20. A rotor assembly for a gas turbine engine comprising:
    an outer rim;
    an inner rim located radially inward of the outer rim;
    a blade coupled to an outer surface of the outer rim;
    an expansion slot passing through the outer surface of the outer rim and an inner surface of the outer rim opposite the outer surface;
    a radial seal defining a portion of the expansion slot, wherein the radial seal is located within a cooling channel between the outer rim and the inner rim; and
    an axial seal disposed at a fore end of the expansion slot, the axial seal comprising a fin configuration, wherein the axial seal extends from the radial seal to the inner surface of the outer rim, and wherein a point of the axial seal is located at a forward end of the axial seal.

* * * * *